United States Patent [19]

Johnson

[11] 3,681,594
[45] Aug. 1, 1972

[54] LAMPHOLDER MOUNTING ASSEMBLY WITH CAPTIVE NUT

[72] Inventor: George E. Johnson, Bronxville, N.Y.

[73] Assignee: Leviton Manufacturing Co., Inc., Brooklyn, N.Y.

[22] Filed: March 16, 1971

[21] Appl. No.: 124,965

Related U.S. Application Data

[63] Continuation of Ser. No. 817,125, April 17, 1969, abandoned.

[52] U.S. Cl.....................240/51.11, 85/32 K, 151/7, 240/52, 339/50 R
[51] Int. Cl....H01r 33/08, F16b 29/00, F16b 39/24
[58] Field of Search..........240/51.11, 52; 339/50, 52, 339/53, 54, 55, 56, 22, 176; 151/7, 47.7, 41.71, 41.72, 41.76; 85/32 R, 32 K

[56] References Cited

UNITED STATES PATENTS

| 2,596,056 | 5/1952 | Tinnerman | 339/53 R |
| 2,223,166 | 11/1940 | Dagley | 339/52 R |
| 3,509,514 | 4/1970 | Christensen et al. | 339/22 |
| 2,465,326 | 3/1949 | Lepove | 339/53 |
| 2,737,269 | 3/1956 | Flora | 85/32 R X |
| 3,524,053 | 8/1970 | Johnson | 240/51.11 R |

Primary Examiner—Joseph F. Peters
Attorney—Cushman, Darby & Cushman

[57] ABSTRACT

A mounting assembly to be used in securing a lampholder to a fixture panel. The lampholder has a base with spaced legs extending forwardly therefrom and defining a slotted opening therebetween with opposing faces of the legs having recesses which extend lengthwise thereof.

A retaining nut extends across said slotted opening with its opposite side edges extending into said recesses. The retaining nut is formed of thin sheet metal and is curved in its lengthwise direction to form a bendable arc-like segment. The arc-like segment, as formed has an overall thickness greater than the width of the recess in the opposing faces of the legs whereby the side edges of the retaining nut are held under compression between opposing surfaces of the recesses when inserted therein. A retaining screw extends into the slotted opening between the legs and engages with a threaded opening in the retaining nut.

12 Claims, 7 Drawing Figures

PATENTED AUG 1 1972 3,681,594
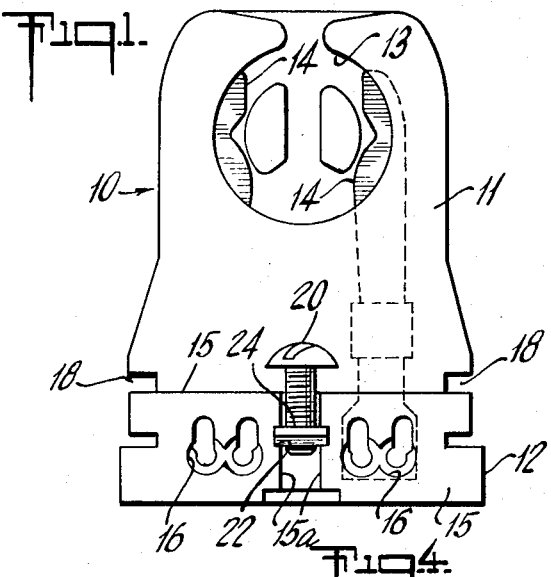
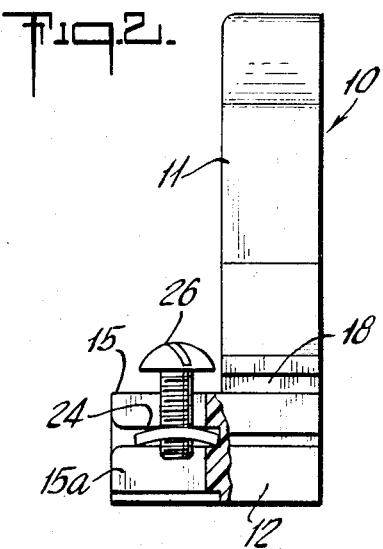
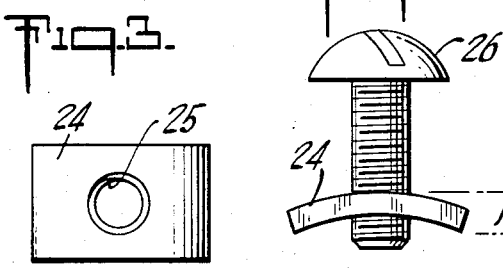
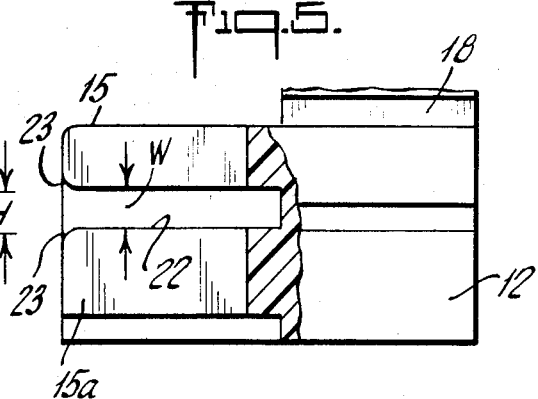
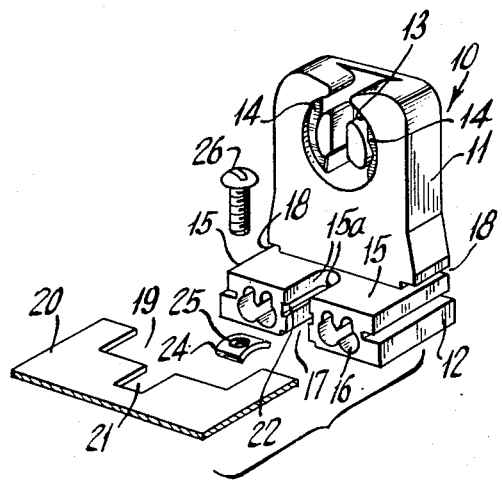
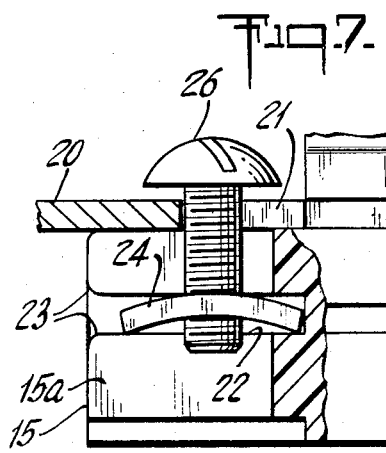
INVENTOR
GEORGE E. JOHNSON
BY
Hanse H. Hamilton
ATTORNEY

LAMPHOLDER MOUNTING ASSEMBLY WITH CAPTIVE NUT

CROSS-REFERENCE TO RELATED APPLICATION

This application is a continuation of application Ser. No. 817,125, filed Apr. 17, 1969, and now abandoned.

The present invention relates to new and useful improvements in a mounting assembly for securing a lampholder to a fixture panel. It relates, more particularly, to a mounting assembly for a lampholder wherein a retaining nut is held captive in the lampholder and in position for engagement with a retaining screw.

An object of the invention is to provide a simple and inexpensive mounting assembly for securing a lampholder to a fixture panel.

A further object of the invention is to provide a mounting assembly in which the parts of the assembly will not become lost or misplaced.

A mounting assembly embodying the present invention includes a retaining nut formed of sheet metal having a curved or arc-like shape. When installed in the lampholder, the retaining nut is held captive in position to receive a retaining screw which may be attached to and carried by the nut. This provides a very inexpensive mounting assembly and greatly simplifies installation of the lampholder on the fixture panel.

Other objects and advantages of the invention will become apparent and will be better understood from the following description and the accompanying drawing in which:

FIG. 1 is a front view of a lampholder and a mounting assembly embodying the present invention;

FIG. 2 is a side view in partial section of the lampholder and mounting assembly shown in FIG. 1;

FIG. 3 is a plan view of a retaining nut forming part of the mounting assembly shown in FIG. 1;

FIG. 4 is a side view of an assembled retaining screw and retaining nut for the mounting assembly shown in FIG. 1;

FIG. 5 is a fragmentary view in partial section of a portion of the lampholder shown in FIG. 1;

FIG. 6 is an exploded view in perspective illustrating the lampholder and mounting assembly of FIG. 1 in conjunction with a fixture panel; and FIG. 7 is a side view in partial section of a portion of the lampholder and mounting assembly of FIG. 1 as installed on a fixture panel.

Referring now to the drawings in detail, there is a lampholder 10 which is of the conventional tombstone type such as are used to support one end of a fluorescent lamp and to establish electrical connections thereto.

As is customary, the lampholder 10 is formed of a plastic insulating material and comprises a body 11 which extends upwardly from a base 12. The body has an opening 13 in the front thereof for introduction of the contact pins of a lamp (not shown). The body 11 and the base 12 which are hollow, enclose contact elements 14 which engage with the lamp pins.

The base 12 has forwardly extending spaced legs 15 which are also hollow and define passageways having openings 16 at their outer ends for the introduction of the ends of conductor wires (not shown) which are connected to the contact elements 14 in a suitable manner. Opposing faces 15a of the legs define an elongated opening 17 which extends rearwardly to the front of the body 11.

At the junction of the body 11 and the base 12, grooves 18 are provided on opposite sides of the body to receive the side edges of a cut-out or opening 19 in a fixture panel or support 20 when the bottom or inner edge of the opening is in abutting relation to the front of the body 11 as shown in FIG. 7. Under these conditions, the legs 15 extend beneath the fixture panel 20 with the body 11 of the lampholder extending upwardly from the panel in a vertical direction. The bottom or inner edge of the opening 19 in the panel 20 contains an open ended slot 21 which extends over and is aligned with the slotted opening 17 between the legs 15 when the lampholder is installed on the panel.

The opposing faces 15a of the legs 15 contain oppositely disposed recesses 22 having entrances or openings at the forward ends of the legs. Upper and lower surfaces of the recesses which define the width W thereof, are relieved, as indicated at 23, to enlarge the entrances and to facilitate the introduction of a retaining nut 24 therein. As noted above, the legs 15 are hollow and hence, the walls forming the opposing faces 15a of the legs 15 are thin. As a result, the recesses must be relatively shallow in depth and are limited in width.

As shown in FIG. 4, the retaining nut 24 is curved in its lengthwise direction and forms an arc-like segment. A threaded opening 25 is provided in the center of the nut to threadably engage with the end of a retaining screw 26. A single convolution of a thread will serve for this purpose.

Prior to assembly of the nut 24 with the lampholder, the overall height or thickness H of the nut which corresponds to the distance between the upper surface of the arc-like segment and the lower outer ends thereof, as indicated in FIG. 4, is slightly greater than the width W of the recesses 22 in the opposing faces of the legs 15. In addition, the lengthwise dimension of the nut 24 is somewhat greater than the distance between the bottoms of the recesses 22 and hence, the nut must be introduced lengthwise into the slotted opening 17 and retaining recesses 22.

However, the retaining nut 24 is formed of thin sheet metal stock which is bendable and thus, the nut can be flattened as it is forced into the recesses 22. In this connection, the relieved entrances to the recesses permit the side edges of the retaining nut to be freely introduced into the recesses 22 for a major portion of their length. When binding takes place between the side edges of the nut and the upper and lower surfaces of the recess, the retaining nut is forced home until it is seated in the recesses with the nut being flattened to conform to the width of the recesses. The nut then extends across the slotted opening 17 between the legs 15 with the threaded opening 25 therein in position to receive the retaining screw 26.

If desired, the retaining screw 26 may be threaded to the retaining nut 24 prior to placing the nut in the recesses. This will not interfere with mounting of the lampholder on the fixture panel as the slot 21 in the panel accommodates the screw with its headed end being exposed for tightening.

When the retaining nut 24 is assembled in the lampholder, the opposite side edges of the nut are confined under compression between the opposing faces of the recesses and the nut is held captive in the slotted opening 17 between the legs. In addition, the end faces of the nut may have pointed or sharp lower ends. Thus, the pointed end at the forward end of the nut will have a tendency to bite into the opposing surface of the recesses and resist removal of the nut from the recesses.

In practice, sheet metal stock having a thickness of approximately 0.042 inches may be used in forming the retaining nut 24 as an arc-like segment having a radius of curvature of about 0.365 inches and an overall height or thickness of between 0.069 and 0.074 inches. The recesses 22 into which the nut is forced are approximately 0.062 inches in width (the distance W between opposing surfaces thereof). The opening in the nut is threaded to receive a number 6–32 screw.

It will be understood that various changes and modifications may be made by those skilled in the art in the embodiment of the invention as illustrated and described herein without departing from the spirit or scope of the invention.

I claim:

1. In an assembly for mounting a lampholder on a fixture panel, the improvement which comprises:
    a. a lampholder having a pair of spaced legs at one end thereof;
    b. said legs having oppositely disposed grooves formed in and extending lengthwise of opposing faces thereof; and
    c. a nut formed of a single thickness of permanently bendable sheet material and having only two opposite side edges extending lengthwise respectively in said grooves;
    d. said side edges being normally curved in a lengthwise direction and having an overall normal nut height greater than the distance between opposing faces of each of said grooves;
    e. said curved side edges being engaged by and compressed between said opposing faces of said grooves and being permanently bent thereby to a curvature flatter than said normal height.

2. In an assembly for mounting a lampholder on a fixture panel, the improvement as defined in claim 1 wherein:
    a. the oppositely disposed grooves in opposing faces of the legs have enlarged open ends for permitting ready insertion of the curved nut in a lengthwise direction into the oppositely disposed grooves in the legs.

3. In an assembly for mounting a lampholder on a fixture panel, the improvement which comprises:
    a. a lampholder formed of a molded material and having a pair of spaced legs at one end thereof,
    b. said spaced legs having opposing faces and oppositely disposed grooves formed in said faces; and
    c. a retaining member formed of a single thickness of permanently bendable sheet material and having a greater dimension in length than in width and further having only two opposite side edges extending lengthwise respectively in said grooves;
    d. said side edges being normally curved in a lengthwise direction and having an overall normal retaining member height greater than the distance between opposing faces of each of said grooves;
    e. said curved side edges being engaged and held by said opposite faces of the grooves in the legs and being permanently bent thereby to a curvature flatter than said normal height.

4. In an assembly for mounting a lampholder on a fixture panel, the improvement as defined in claim 3 in which:
    a. the retaining member fits into the grooves in the legs only when inserted therein in said lengthwise direction; and
    b. the grooves in the legs have enlarged openings at the ends thereof.

5. In a mounting for a lampholder having a pair of spaced legs at one end thereof with oppositely disposed grooves formed in and extending lengthwise along opposing faces of said legs, the improvement which comprises:
    a. an arcuately shaped retaining member having two lengthwise side edges and being adapted to extend between said legs with only said two side edges thereof fitting into said oppositely disposed grooves respectively;
    b. said arcuate retaining member having a threadable opening at the center thereof and comprising a single thickness of permanently bendable sheet metal;
    c. said sheet metal having a thickness less than the width of the respective grooves and said lengthwise side edges of said arcuately shaped member being normally curved in their lengthwise direction to an overall height which is greater than the width of said grooves;
    d. said side edges also being permanently deformed to a curvature of less than said normal height by engagement with the opposing faces of the respective grooves.

6. In a mounting assembly for a lampholder, the improvement as defined in claim 5 wherein:
    a. the length of the retaining member is greater than the width thereof.

7. In a mounting for a lampholder having a pair of spaced legs at one end thereof with oppositely disposed grooves formed in and extending lengthwise along opposing faces of said legs, the improvement which comprises:
    a. an arcuately shaped retaining member adapted to extend between said legs with side edges thereof fitting into said oppositely disposed grooves;
    b. said arcuate retaining member having a threadable opening at the center thereof and comprising a single thickness of bendable sheet metal;
    c. said sheet metal having a thickness less than the width of the respective grooves and being curved to an overall thickness which is greater than the width of said grooves;
    d. said sheet metal also being deformable when the side edges of said arcuate retaining member are engaged by opposing faces of the respective grooves; wherein:
    e. the arcuate retaining member has angularly disposed faces formed at opposite ends thereof;
    f. said end faces being disposed at acute angles relative to opposing surfaces of the grooves and defining sharp corners engaging with said surfaces in lengthwise movement of the retaining member relative thereto.

8. In an assembly for mounting a lampholder on a fixture panel, the combination which comprises:
    a. a lampholder molded of plastic material and having a pair of spaced legs extending from one end thereof;

b. said legs having grooves formed in opposing faces thereof and extending lengthwise thereof;
c. said grooves having open ends and upper and lower faces defining the width thereof; and
d. an arcuate retaining member in the form of a threaded nut comprising a single thickness of bendable sheet metal and having curved side edges extending into said oppositely disposed grooves;
e. said arcuate retaining member being curved in a lengthwise direction and having a curved thickness greater than the width of said grooves;
f. said curved side edges being engaged by the upper and lower faces of said grooves and being held under compression therebetween; wherein:
g. the retaining member has end faces disposed at an acute angle relative to the opposing faces of the grooves;
h. said end faces having sharp corners engaging with said faces in lengthwise movement of the retaining member relative thereto.

9. In an assembly for mounting a lampholder, the combination as defined in claim 8 wherein:
the grooves in opposing faces of the legs have enlarged openings at their ends for permitting the side edges of the arcuate retaining member to be introduced in the grooves freely when the retaining member is inclined relative to said openings.

10. In an assembly for mounting a lampholder on a fixture panel, the improvement which comprises:
a. a lampholder formed of plastic material and having a body and a base;
b. said base including a pair of spaced legs extending outwardly therefrom;
c. said legs having opposing vertical faces containing oppositely disposed open-ended grooves which extend lengthwise of the legs;
d. said grooves having a width defined by opposing upper and lower faces; and
e. an arcuate blank formed from a single thickness of a deformable non-resilient metal;
f. said blank being curved in a lengthwise direction to a curvature greater than the width of the grooves and having its only two curved side edges respectively extending into said oppositely disposed grooves;
g. said curved side edges being permanently deformed to a flatter condition than said curvature by engagement thereof between said upper and lower faces of the grooves.

11. In an assembly for mounting a lampholder on a fixture panel, the improvement as defined in claim 10, which includes:
a. a threaded member engaging with a central portion of the arcuate blank at a point between the said legs;
b. said threaded member having a headed and extending above the legs for clamping engagement with a supporting panel.

12. In an assembly for mounting a lampholder on a fixture panel, the improvement as defined in claim 10 wherein:
each of the oppositely disposed grooves in the leg has an enlarged opening at an outer end thereof for receiving the curved side edges of the arcuate blank therein without deforming said side edges.

* * * * *